United States Patent
Herz (10) Patent No.: US 9,529,865 B2
(45) Date of Patent: Dec. 27, 2016

(54) INTERVAL BASED FUZZY DATABASE SEARCH

(71) Applicant: Andreas Herz, Walldorf (DE)

(72) Inventor: Andreas Herz, Walldorf (DE)

(73) Assignee: SAP SE, Walldorf (DE)

( * ) Notice: Subject to any disclaimer, the term of this patent is extended or adjusted under 35 U.S.C. 154(b) by 240 days.

(21) Appl. No.: 14/179,307

(22) Filed: Feb. 12, 2014

(65) Prior Publication Data

US 2015/0227594 A1 Aug. 13, 2015

(51) Int. Cl.
*G06F 17/30* (2006.01)

(52) U.S. Cl.
CPC ... *G06F 17/30542* (2013.01); *G06F 17/30109* (2013.01); *G06F 17/30551* (2013.01); *G06F 17/30867* (2013.01)

(58) Field of Classification Search
CPC .................. G06F 17/30542; G06F 17/30109; G06F 17/30867
USPC ............... 707/706, 722, 736, 758, 759, 760, 769, 707/781, 999.001–999.005
See application file for complete search history.

(56) References Cited

U.S. PATENT DOCUMENTS

| | | | |
|---|---|---|---|
| 5,812,996 A | 9/1998 | Rubin et al. | |
| 5,822,749 A | 10/1998 | Agarwal | |
| 5,864,842 A | 1/1999 | Pederson et al. | |
| 7,376,638 B2 | 5/2008 | Gordon | |
| 7,401,069 B2 | 7/2008 | Day et al. | |
| 7,577,699 B2 | 8/2009 | Denk et al. | |
| 7,743,015 B2 | 6/2010 | Schmitt | |
| 8,290,931 B2 | 10/2012 | Hong et al. | |
| 8,412,713 B2 | 4/2013 | Stewart et al. | |
| 8,515,945 B2 | 8/2013 | Pendap et al. | |
| 8,626,729 B2 | 1/2014 | Whitehead et al. | |
| 2003/0182449 A1 | 9/2003 | Anderson et al. | |
| 2010/0211618 A1 | 8/2010 | Anderson et al. | |
| 2010/0257181 A1 | 10/2010 | Zhou et al. | |
| 2012/0158692 A1 | 6/2012 | Schroiff et al. | |
| 2012/0197900 A1* | 8/2012 | Mandre | 707/743 |
| 2013/0151491 A1 | 6/2013 | Gislason | |

OTHER PUBLICATIONS

Ya-Han Hu et al., "Mining Multi-level Time-interval Sequential Patterns in Sequence Databases." Software Engineering and Data Mining (SEDM), 2010 2nd International Conference On, IEEE, Piscataway, NJ, USA, Jun. 23, 2010 (Jun. 23, 2010), pp. 416-421, XP031728087, ISBN: 978-1-4244-7324-3 *the whole document*.

Byeong-Seob You et al., "Hybrid Index for Spatio-temporal OLAP Operations", Jan. 1, 2006 (Jan. 1, 2006) Advances in Information Systems Lecture Notes in Computer Science; LNCS, Springer, Berlin, DE, pp. 110-118 XP019045640, ISBN: 978-3-540-46291-0 *the whole document*.

* cited by examiner

*Primary Examiner* — Syling Yen
(74) *Attorney, Agent, or Firm* — Fountainhead Law Group P.C.

(57) ABSTRACT

A fuzzy database search technique is described for searching a database. The technique first prepares a database by first generating a reference hash value for each database entry to represent a value stored in a field of the database entry. The technique then receives search request to search for database entries in the database that have a value stored in the field that is within a provided range. The technique converts the search request into one or more search hash values and matches the search hash values to the reference hash values of the database to rapidly identify database entries that are likely relevant to the search.

16 Claims, 6 Drawing Sheets

INTERVAL BASED FUZZY DATABASE SEARCH

BACKGROUND

Databases are containers created to store, retrieve, and manage large quantities of information. The database can store the information according to a schema which implements the relevant data structures within the database. The schema can be created from a database model that reflects the structure of the information to be stored in the database.

As more information is added to a database, the size of the database grows. This can cause performance issues, particularly when attempting to locate data in the database. Typically, a database search is performed by a database management system. The database management system receives a search request containing search parameters and searches the database for entries according to the search parameters. Depending on the size of the database, the customer can experience a delay between submitting the search request and receiving the results. As databases grow, the delay can also grow, sometimes exponentially.

Besides database size, the delay can also grow due to the complexity of the search request. For example, a search request for a range of values can incur an additional delay since the entire range must be checked for in the database. Similarly, complex search queries require additional processing time. For example, a search request containing conditional statements such as "and" and "or" take more processing time since each conditional parameter must be examined. In certain scenarios such as a business environment, searching the database can be undesirably slow due to the length of these delays.

SUMMARY

In one embodiment, a computer-implemented method receives, by a processor, a request to search a database, the request including a first search parameter identifying a first range of values. The method then generates, by the processor, at least one search hash value in response to the request, wherein each search hash value represents an interval containing values, each interval being non-overlapping. The method then searches, by the processor, the database to identify a database entry that contains a search hash value from the at least one search hash value in a reference field of the database entry. The method then returns, by the processor, the identified database entry.

In another embodiment, a non-transitory computer readable storage medium stores one or more programs comprising instructions for receiving a request to search a database, the request including a first search parameter identifying a first range of values, generating at least one search hash value in response to the request, wherein each search hash value represents an interval containing values, each interval being non-overlapping, searching the database to identify a database entry that contains a search hash value from the at least one search hash value in a reference field of the database entry, and returning the identified database entry.

In another embodiment, a computer implemented system comprises one or more computer processors and a non-transitory computer-readable storage medium. The non-transitory computer-readable storage medium comprises instructions, that when executed, control the one or more computer processors to be configured for receiving a request to search a database, the request including a first search parameter identifying a first range of values, generating at least one search hash value in response to the request, wherein each search hash value represents an interval containing values, each interval being non-overlapping, searching the database to identify a database entry that contains a search hash value from the at least one search hash value in a reference field of the database entry, and returning the identified database entry.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Various embodiments described herein provide a search technique that can be performed by a database management system to quickly locate database entries that satisfy a search request. The search technique described can prove to be particularly useful for complex search queries that contain conditional statements. The search technique can include preprocessing the database to add reference hashes values to the database entries. The reference hash values can be added to the database entries by modifying the database schema to update an existing field or to add a new field for storing the reference hash value. The field of the database entry that stores the reference hash value can be called a reference hash field.

Once the database has been preprocessed, the search technique can receive a search request containing search parameters. The search parameters can specify a value, a range of values, or multiple ranges of values. The values can be related to time and the ranges of values time intervals. The search parameters can be converted into one or more search hash values using the same or similar algorithm used in the preprocessing. The one or more search hash values, which represent time intervals that encompass the search parameters, can then be used to search for database entries that satisfy the search request. By converting the search parameters into multiple search hash values, a search request containing multiple search parameters can be processed by a single call to determine whether the reference hash value of a database entry matches one of the search hash values. This can dramatically reduce the time spent on searching the database. The search technique is a type of fuzzy search in that the search is a quick lookup to identify database entries that are likely to be relevant to the search request. While most of the results satisfy the search parameters, there may be some results that do not. Other techniques can subsequently be used to refine the search results. For example after locating database entries that belong to a particular time interval, a second technique can be utilized to determine which database entries out of the database entries located are within a provided geo-location. In other examples, other techniques can be applied to refine or narrow the search results.

Figure 1:
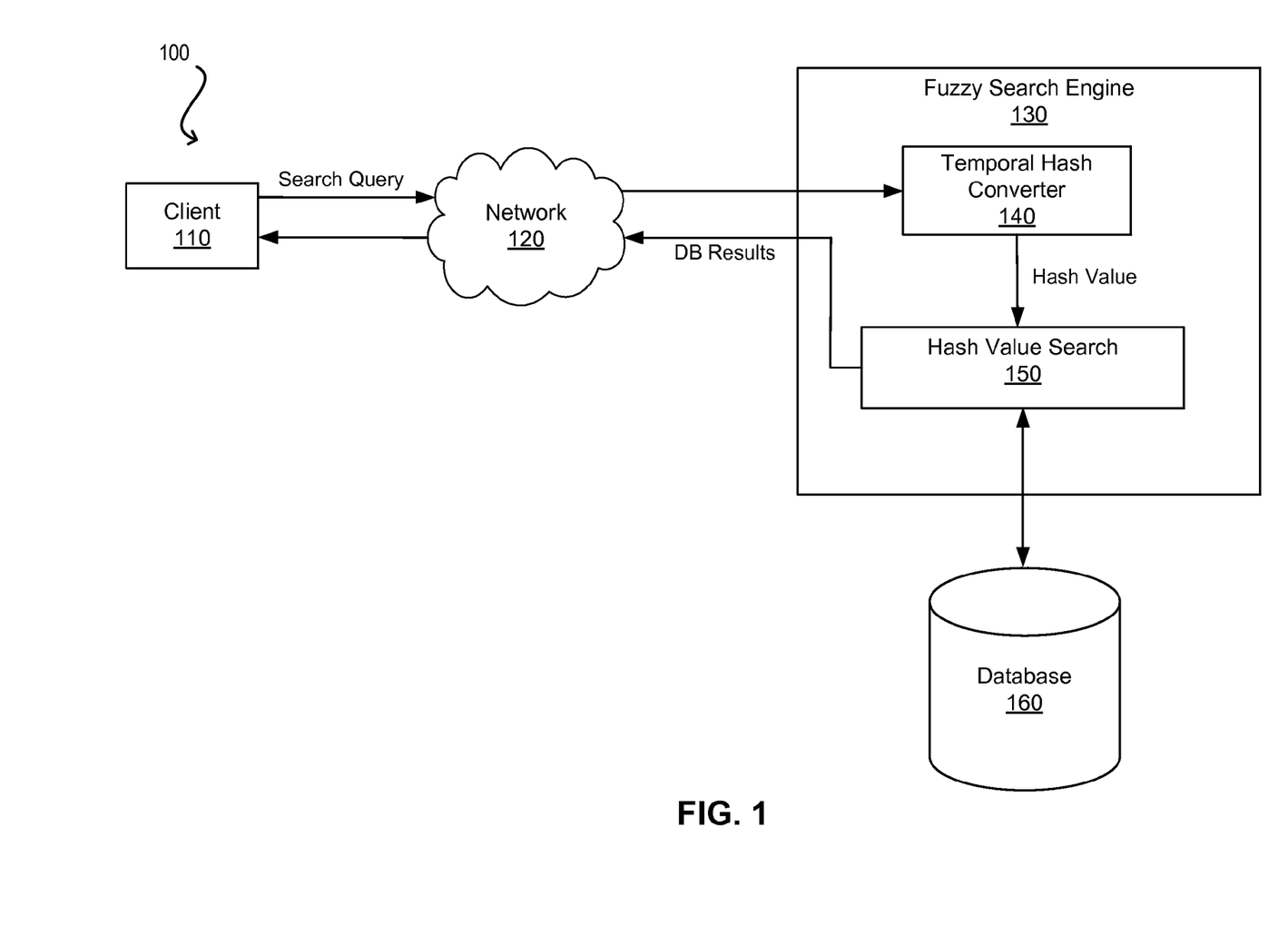
FIG. 1 illustrates a system according to one embodiment.

FIG. 1 illustrates system 100 according to one embodiment. System 100 includes client 110, fuzzy search engine 130, and database 160. Client 110 can communicate with fuzzy search engine 130 through network 120. In some examples, network 120 can be a local area network, wide area network, Bluetooth network, or other types of wired or wireless networks. Client 110 can submit a search request to fuzzy search engine 130 via network 120 to search for information in database 160. The search request can be to locate data within database 160 that meet one or more search parameters. Each search parameter can be a value, or a range of values where the search request is to locate database entries that satisfy or are likely to satisfy the value or range of values. In this embodiment, each search parameter is a time or time interval. A database entry satisfies a single value search parameter when the database entry has a corresponding time field that contains the single value. A database entry satisfies a range value search parameter when the database entry has a corresponding time field that contains a time value that is within the range of values specified by the search parameter, which can include the outer boundaries of the range of values. In other embodiments, search parameter can be a unit of distance or some other unit of measurement.

Fuzzy search engine 130 generates database results in response to the search request. The database results include one or more database entries from database 160 that are likely to satisfy the search request. Fuzzy search engine 130 includes temporal hash converter 140 and hash value search 150. Temporal hash converter 140 is configured to convert the search request received by fuzzy search engine 130 into one or more search hash values. Each search hash value can represent a time interval. In one example, the conversion is performed by a hash function of temporal hash converter 140.

The length of the search hash value generated can be directly related to the duration of the time interval that the search hash value is representing. For instance, a search hash value having a long length can represent a smaller time interval while another search hash value having a short length can represent a longer time interval. In one embodiment, the search hash values can cover a period of time that is substantially equal to the period of time described by the search criteria. For example if the search criteria is for items shipped on 1/13/14 from 3-8 pm, the search hash value(s) can represent a period of time between 3-8 pm on 1/13/14. As another example if the search criteria is for items shipped on 1/14/14, the search hash value(s) can represent a period of time between 12:00 am and 11:59 pm on 1/14/14. In another embodiment, the search hash value(s) can represent a period of time that extends past the period of time specified by the search request. For instance if the search parameter is for items shipped on 1/15/14 from 3-8 pm, the search hash value(s) can represent a period of time from 1/15/14 from 1-9 pm. This can be due to the time intervals defined by the search hash values For example, a search hash value can be associated with the time interval 1 pm-5 pm on 1/15/14 while another search hash value can be associated with the time interval 5 pm-9 pm on 1/15/14. Since the search parameter is for a time period that overlaps the time intervals associated with both search hash values, temporal hash converter 140 can return both search hash values.

In one embodiment, temporal hash converter 140 can generate search hash values of the same length, regardless of the search parameters in the search request. For example, temporal hash converter 140 can generate one or more search hash values for a search parameter specifying an hour. Temporal hash converter 140 can also generate one or more search hash values of the same length for another search parameter specifying a longer period of time such as an entire day (however more search hash values can be generated for the search parameter specifying a day than the search parameter specifying an hour). In some examples, different search hash values of the same length can represent the same duration of time but at different points in time. For instance, search hash value '13245' can represent a four hour window while hash value '13248' also represents a four hour window, albeit at a different point in time. In some examples, the windows of time associated with the search hash values do not overlap.

In one embodiment, temporal hash converter 140 can receive additional parameters other than the search parameters. The additional parameters can adjust the performance of temporal hash converter 140 and in turn effect the search hash values generated. In one example, a length parameter can specify the length of the search hash value. Shortening the length of the search hash value can have an effect of enlarging the time intervals represented by the search hash value, thereby adjusting the performance of the fuzzy search engine 130. The larger time intervals can also result in a smaller number of search hash values generated. In some examples, the length parameter can also be used when adding search hash values to the data in database 160. This can ensure that the search hash values and the reference hash values are of the same length.

Hash value search 150 is configured to search database 160 for data based on one or more hash values. In one example, hash value search 150 can match reference hash values belonging to database entries in database 160 against the search hash value(s). Database entries that a reference hash value that matches a search hash value can be returned as part of database results. In one embodiment, hash value search 150 can match a reference hash value against a search hash value by matching one or more characters. In some examples, a match can be found even though not all characters of the reference hash value match. For example, hash value search 150 can consider a search hash value with four characters as a match for a reference hash value having six characters when the first four characters of the value matches the hash value. In other words, all of the characters of the search hash value have been matched. Once the database results are identified by hash value search 150, fuzzy search engine 130 can transmit the database results to client 110 via network 120. In some examples, hash value search 150 can match database entries across multiple databases and return the combined results as part of database results.

In one embodiment, additional parameters can be applied to hash value search 150 to broaden or narrow the search. For example, an accuracy parameter can be set to adjust the number of characters in the search hash value to match against reference hash values. The accuracy parameter can be used by client 110 or fuzzy search engine 130 to specify how accurate the database results are to the search parameters. For example if the search hash value is '14325' and the accuracy parameter is set to 4 (representing matching 4 characters max), hash value search 150 can match database 160 for database entries that have a reference hash value containing '1432' as the first four characters. This means that the search can return database entries having a reference hash value set to '14325' plus database entries having a reference hash value set to '14321,' '14322,' '14323,' '14324,' '14326,' '14327,' '14328,' or '14329.' In one example, the search request can include an accuracy parameter provided by client 110 that is used by hash value search 150 when querying database 160.

Figure 2:
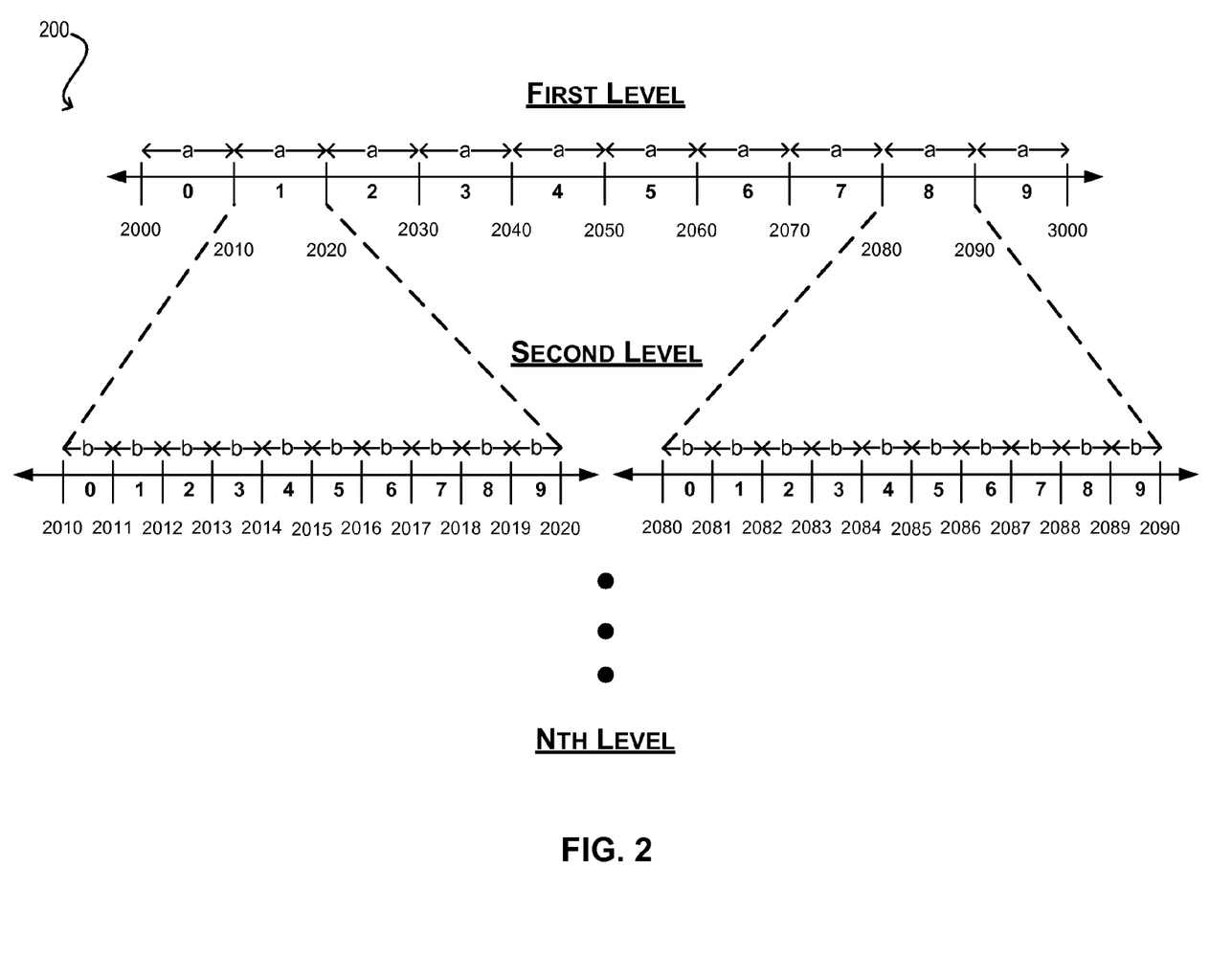
FIG. 2 illustrates a technique for generating a hash value according to one embodiment.

FIG. 2 illustrates a technique for generating a hash value according to one embodiment. Each hash value can represent a non-overlapping window of time, also known as a time interval. Technique 200 begins by specifying a boundaries for the first level. In one example, the boundaries can define the outer limits which all database entries in the database belong to. Here, all database entries have a time value that is between the year 2000 and the year 3000 and thus the time line is set as 2000-3000. Technique 200 divides the time line into a set of equally sized time intervals. Each time interval represents a window of time specified by the letter 'a'. The set can include a base number of equally sized time intervals where the base number can be set by the search engine or by the customer. Here, the base number is 10 and thus the outer limits measurement is divided into 10 time intervals of equal length. Each time interval can be assigned a character from a character set. The character set can include a number of unique characters that are equal to the base number. Here, the character set is the numbers '0-9.' Time interval 2000-2010 is assigned the character '0,' time interval 2010-2020 is assigned the character '1,' and so forth.

Technique 200 can then recursively divide each time interval into a set of equally sized sub-time intervals to generate the second level. Similar to the first level, the second level can include a number of sub-time intervals that equal to the base number. Also similar to the first level, the sub-time intervals of the second level can be associated with a character from the character set in a similar manner. Here, sub-time interval 2010-2011 is assigned the character '0,' sub-time interval 2011-2012 is assigned the character '1,' as so forth. Similarly, sub-time interval 2080-2081 is assigned the character '0' and sub-interval 2081-2082 is assigned the character '1.' Each sub-time interval in the second level represents a window of time specified by the letter 'b'. As shown, 10 'b' windows equal to a single 'a' window. In some examples, the characters can be assigned to the sub-time intervals according to their position on the timeline. For instance, sub-time intervals that appear closer to the smaller end of the time line are assigned a character first (2010-2011 is assigned the number '0' and 2018-2019 is assigned the number '8'). Depending on the desired window size, technique 200 can divide each sub-time interval until the desired window size is reached. For example, only a first level is needed if the desired window size is 10 years since each time interval is a 10 year window. However, a third level or higher level is needed if the desired window size is smaller than a one month window. The desired window size can be a variable that is set for technique 200.

In one embodiment, technique 200 can be utilized to prepare the database and to perform a database search. For database preparation, technique 200 can generate a reference hash value in response to receiving a value in a predefined field of a database entry. The technique can be applied to all database entries in the database to generate a reference hash value for the predefined field. Once database preparation has been completed, technique 200 can be utilized to perform a database search. The database search can receive a search request that includes one or more search parameters. Each search parameter can identify a value or a range of values. Technique 200 can be applied to value or range of values from the search parameter to generate one or more search hash values. The one or more search hash values can be matched to the reference hash values of the database entries. The database entries with a reference hash value that matches one of the search hash values can be returned as part of database results.

Figure 3:
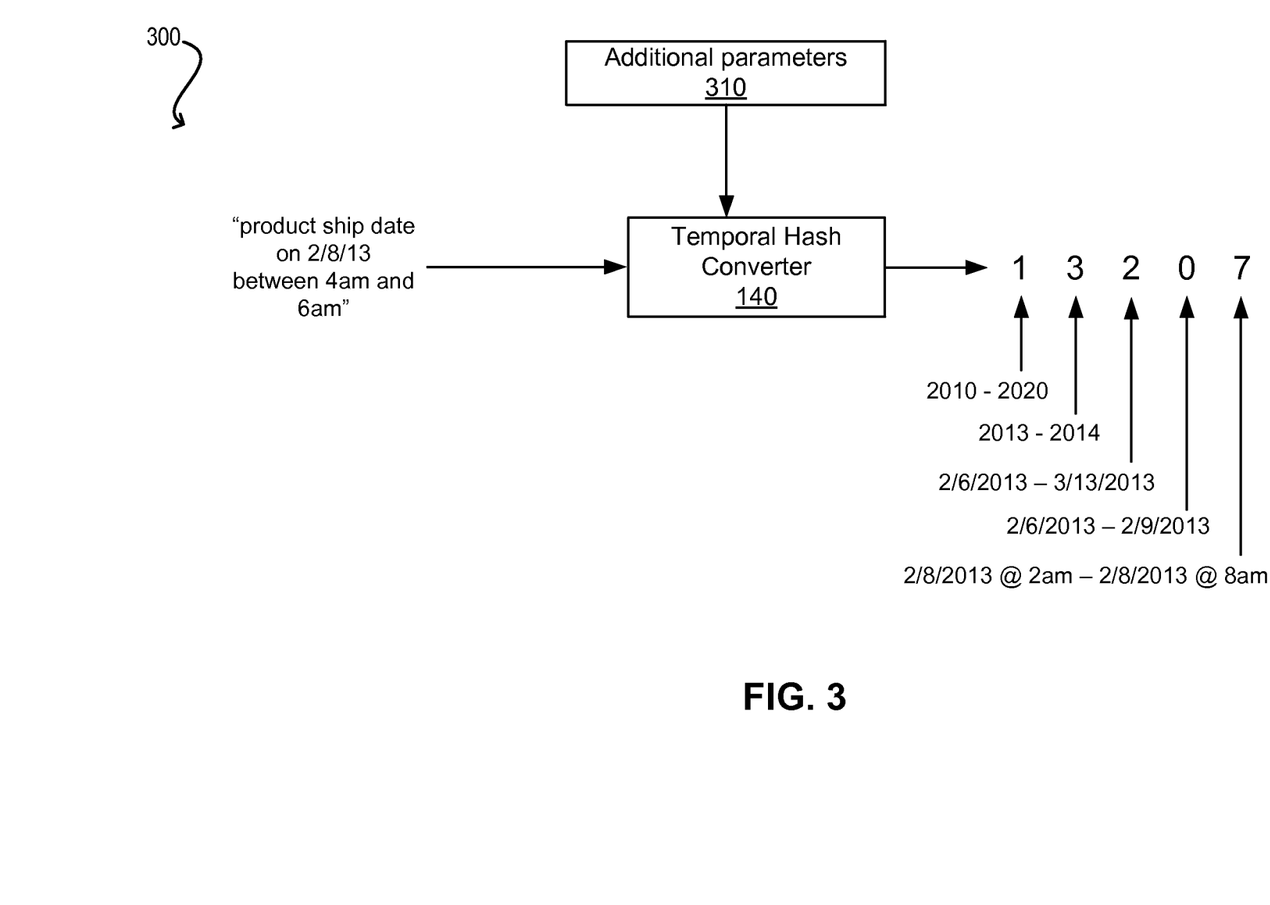
FIG. 3 illustrates the conversion of a time-based search parameter to a hash value according to one embodiment.

FIG. 3 illustrates the conversion of a time-based search parameter to a hash value according to one embodiment. As shown, temporal hash converter 140 receives a search parameter requesting all products shipped on 2/8/13 between the hours of 4 am and 6 am. Temporal hash converter 140 receives additional parameters 310. In one example, an additional parameter can be setting the length of the hash value that will be output. In another example, the additional parameter can be setting the desired window size for the hash values. Both of these additional parameters can affect the precision. Typically, a reduction in the precision of the search (e.g., generating shorter hash values) can improve the speed of the search.

Temporal hash converter 140 generates a hash value based on the search parameter and additional parameters 310. The generation of the hash value can be based on a technique such as technique 200 of FIG. 2. Here, the first character of the hash value is set to '1' since the search window of 2/8/13 between 4 am and 6 am is between 2010 and 2020 in the first level of technique 200. When the window 2010-2020 is further divided, the search window falls within the fourth time interval (e.g., 2013-2014) and therefore a character '3' is appended to the hash value. In a similar fashion, the characters '2,' '0,' and '7' are in turn appended to the hash value. The resulting hash value '13207' represents a time interval of 2/8/13 between 2 am and 8 am. Since this time interval encompasses the search parameter at the desired precision (as determined by additional parameters 310), temporal hash converter 140 outputs the hash value. This hash value can in turn by utilized by hash value search 150 to locate database entries that have a shipping date between 2 and 8 am on 2/8/13. In other examples where the resulting hash value is not related to a time interval that fully encompasses the search parameter, additional hash values can be generated until the one or more hash values encompass the search parameter. The additional hash values can be sequential or non-sequential. In other embodiments, other characters can be used in generating the hash value. For instance, the 26 letters of the alphabet can be used, where each letter represents one of 26 equally spaced time intervals. Each sub-interval would also be divided in 26 equally spaced time intervals. In other embodiments, the search parameters can include distances or other types of measurements, or even numbers.

Figure 4A:
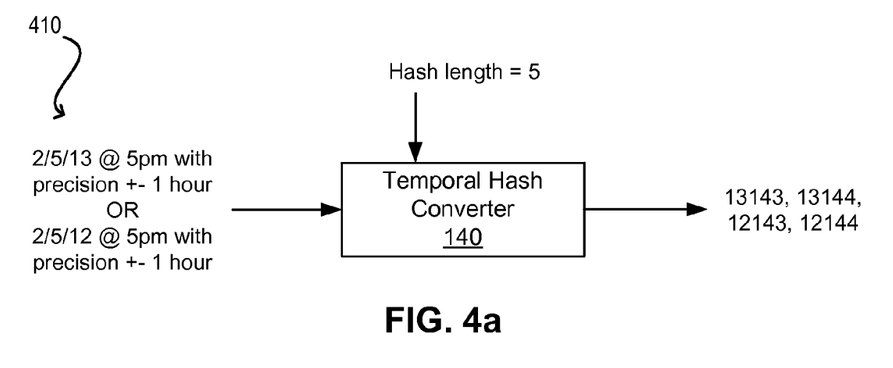
FIG. 4a illustrates the conversion of a time-based search request that includes conditional logic according to one embodiment.

FIG. 4a illustrates the conversion of a time-based search request that includes conditional logic according to one embodiment. As shown in 410, the search request includes two search parameters that are joined by an OR condition. Thus, database entries that match either one of the search parameters should be located. Traditionally, this process requires multiple passes through the database. A first pass is used to identify database entries that satisfy the first search parameter. The results from the first pass are saved in an interim table. A second pass is then used to identify database entries that satisfy the second search parameter. The results from the second pass are then combined with the results in the interim table. Thus, multiple passes are required to process the search request.

In contrast, temporal hash converter 140 can process each search parameter to generate hash values. Since the combination logic is an OR condition, temporal hash converter 140 can join the search hash values generated for each search parameter into a combined list. Hash value search 150 can then search database 160 to locate database entries that match one of the search hash values. Since the search hash values are in a combined list, only a single pass of the search function is needed to locate all potentially relevant database entries.

Figure 4B:
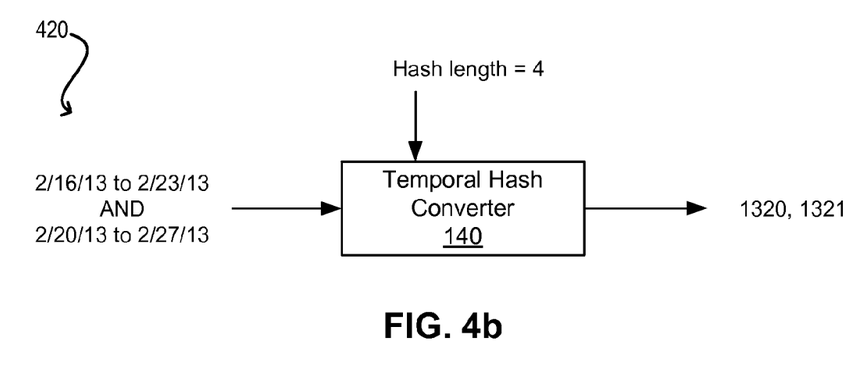
FIG. 4b illustrates the conversion of another time-based search request that includes conditional logic according to one embodiment.

FIG. 4b illustrates the conversion of another time-based search request that includes conditional logic according to one embodiment. As shown in 410, the search request is two search parameters joined by an AND condition. Temporal hash converter 140 can process each search parameter to generate search hash values and subsequently apply the conditional logic to the generated search hash values. Here, temporal hash converter 140 can generate a first list containing search hash values '1319,' '1320,' and '1321' from the first search parameter of 2/16/13-2/23/13. Temporal hash converter 140 can also generate a second list containing search hash values '1320,' '1321,' and '1322' from the second search parameter 2/19/13-2/25/13. Once the hash values for each search parameter are generated, the conditional logic can be applied. Here, an AND condition is applied to the two lists, resulting in a final list of search hash values. The search hash values can subsequently be utilized by hash value search 150 to locate the potentially relevant database entries in a single pass.

Figure 5:
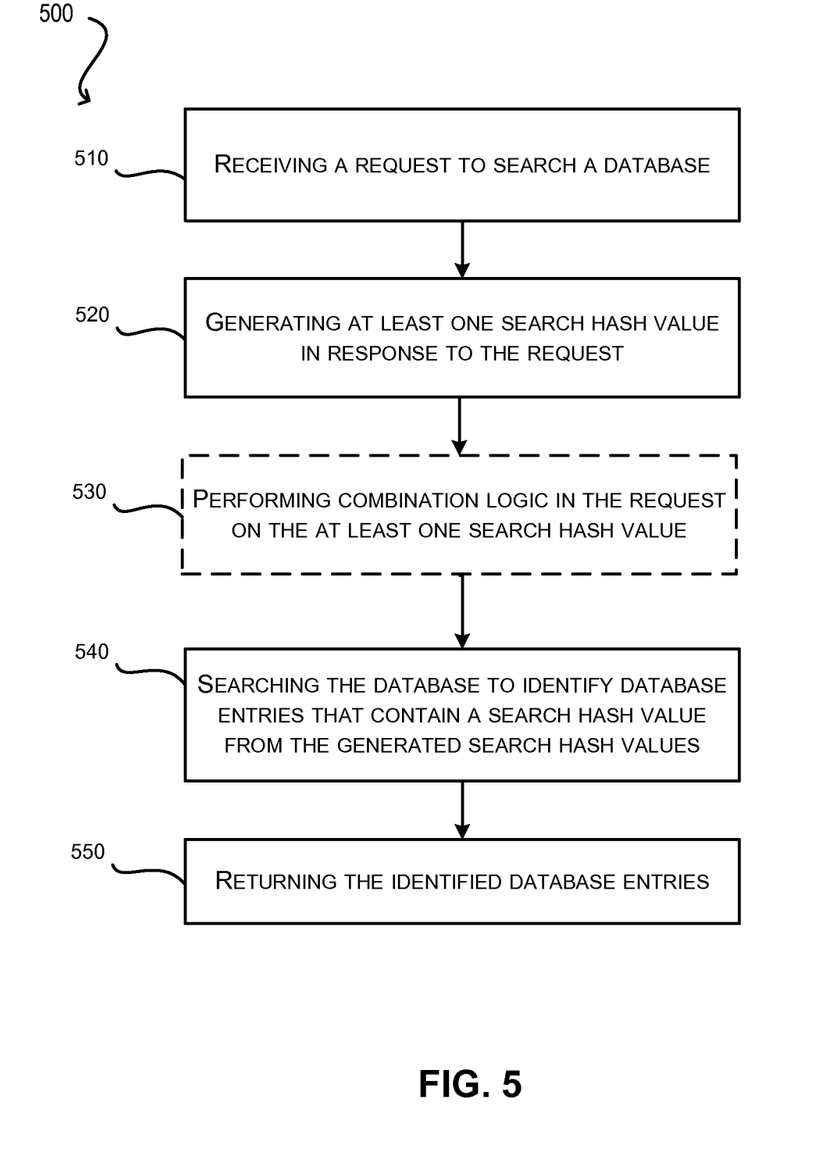
FIG. 5 illustrates a process flow for providing a searching a database according to one embodiment.

FIG. 5 illustrates a process flow for providing a searching a database according to one embodiment. Process 500 can be stored in computer readable medium and executed by a processor. Process 500 begins by receiving a request to search a database at 510. In one example, the search request can include one or more search parameters and optionally conditional logic for joining the search parameters. A given search parameter can identify a range of values which would satisfy the search. The search parameters can be overlapping. In some examples, other additional parameters can be included that control the precision or accuracy of the search. Searches with high precision can be performed slower but result a smaller set of database results that are more likely to meet the search parameters. In contrast, searches with low precision can be performed faster but return a larger set of database results. In one example, the range of values is a time interval.

After receiving the request, process 500 continues by generating at least one search hash value in response to the request at 520. Each search hash value can represent an interval of values. In one example, the intervals can be non-overlapping. In another example, the intervals represented by the search hash values, when combined, can encompass (i.e., cover) the range of values identified by the search parameters.

After generating the search hash values, process 500 can optionally perform combination logic on the search hash values at 530. In some scenarios, the request can include combination logic to combine search parameters. For example, search parameters can be joined by an OR condition or an AND condition. The remaining search hash values after performing the combination logic are used to perform the search on the database.

Process 500 continues by searching the database to identify database entries that contain a search hash value from the generated search hash values at 540. If combination logic was performed, the resulting search hash values after performing the combination logic are used. Searching the database can include locating database entries that have a value stored in a reference field that matches one of the search hash values. If a match is found, the database entry is considered part of the search results. After searching the database, the identified database entries are returned at 550.

Figure 6:
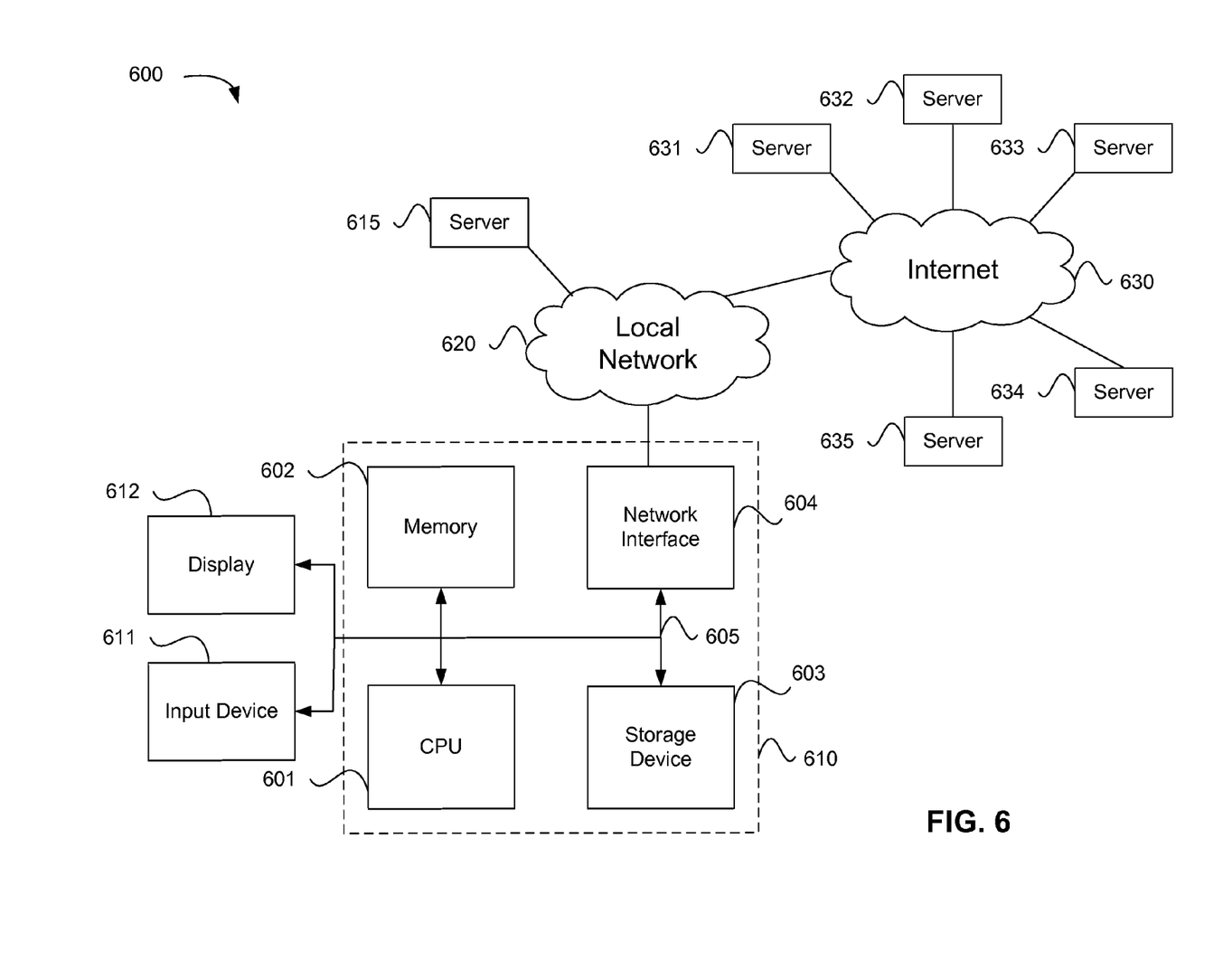
FIG. 6 illustrates an exemplary computer system according to one embodiment.

An exemplary computer system 600 is illustrated in FIG. 6. Computer system 610 includes bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 905 may be divided into multiple specialized buses.

Computer system 610 also includes a network interface 604 coupled with bus 605. Network interface 604 may provide two-way data communication between computer system 610 and the local network 620. The network interface 904 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
preprocessing a database in a data storage device to modify a database schema for the database from an initial schema into a database schema that comprises a reference hash field for each database entry of the database for adding reference hash values to the reference hash fields of the database entries;
receiving, by a processor in a search engine, a request from a client computer system to search the database, the request including a first search parameter identifying a first range of values, a second search parameter identifying a second range of values, and combinational logic for joining the first search parameter and the second search parameter;
converting, by the search engine processor, the first search parameter into a first search hash value and the second search parameter into a second search hash value in response to the request, wherein the first search hash value represents an interval containing the first range of values and the second search hash value represents an interval containing the second range of values;
searching, by the search engine processor, the database to identify database entries having reference hash values stored in the reference hash fields of the database entries that match the first search hash value and the second search hash value;
joining database entries having hash values matching the first hash values and the second hash values into a combined list of database entries based on the combinational logic; and
returning, by the search engine processor, the combined list of identified database entries to the client computer system.

2. The computer-implemented method of claim 1, wherein the length of a search hash value is inversely proportional to the length of an interval.

3. The computer-implemented method of claim 1, wherein a first database entry matching a first hash value generated from the first search parameter and a second database entry matching a second hash value generated from the second search parameter are identified when searching the database.

4. The computer-implemented method of claim 1, wherein generating the search hash values comprises identifying, from a plurality of intervals, an interval that contains at least a portion of the first range of values.

5. The computer-implemented method of claim 1, wherein the first and second range of values each represent a non-overlapping period of time.

6. The computer-implemented method of claim 1 further comprising:
dividing the interval containing the first range of values into a set of equally sized intervals; and
recursively dividing each interval into a set of equally sized sub-time intervals.

7. The computer-implemented method of claim 1 wherein searches with high precision are performed slower but result in a smaller set of database results, and wherein searches with low precision are performed faster but return a larger set of database results.

8. A non-transitory computer readable storage medium storing one or more programs, the one or more programs comprising instructions, which when executed by a computer system, cause the computer system to perform operations for:
preprocessing a database in a data storage device to modify a database schema for the database from an initial schema into a database schema that comprises a reference hash field for each database entry of the database for adding reference hash values to the reference hash fields of the database entries;
receiving, by a processor in a search engine, a request from a client computer system to search the database, the request including a first search parameter identifying a first range of values, a second search parameter identifying a second range of values, and combinational logic for joining the first search parameter and the second search parameter;
converting, by the search engine processor, the first search parameter into a first search hash value and the second search parameter into a second search hash value in response to the request, wherein the first search hash value represents an interval containing the first range of values and the second search hash value represents an interval containing the second range of values;
searching, by the search engine processor, the database to identify database entries having reference hash values stored in the reference hash fields of the database entries that match the first search hash value and the second search hash value;
joining database entries having hash values matching the first hash values and the second hash values into a combined list of database entries based on the combinational logic; and
returning, by the search engine processor, the combined list of identified database entries to the client computer system.

9. The non-transitory computer readable storage medium of claim 8, wherein the length of a search hash value is inversely proportional to the length of an interval.

10. The non-transitory computer readable storage medium of claim 8, wherein a first database entry matching a first hash value generated from the first search parameter and a second database entry matching a second hash value generated from the second search parameter are identified when searching the database.

11. The non-transitory computer readable storage medium of claim 8, wherein generating the search hash values comprises identifying, from a plurality of intervals, an interval that contains at least a portion of the first range of values.

12. The non-transitory computer readable storage medium of claim 8, wherein the first and second range of values each represent a non-overlapping period of time.

13. A computer system comprising:

one or more computer processors; and a non-transitory computer-readable storage medium comprising instructions, that when executed by the one or more computer processors, controls the one or more computer processors to be configured for performing operations comprising:

preprocessing a database in a data storage device to modify a database schema for the database from an initial schema into a database schema that comprises a reference hash field for each database entry of the database for adding reference hash values to the reference hash fields of the database entries;

receiving a request from a client computer system to search the database, the request including a first search parameter identifying a first range of values, a second search parameter identifying a second range of values, and combinational logic for joining the first search parameter and the second search parameter;

converting the first search parameter into a first search hash value and the second search parameter into a second search hash value in response to the request, wherein the first search hash value represents an interval containing the first range of values and the second search hash value represents an interval containing the second range of values;

searching the database to identify database entries having reference hash values stored in the reference hash fields of the database entries that match the first search hash value and the second search hash value; and joining database entries having hash values matching the first hash values and the second hash values into a combined list of database entries based on the combinational logic; and returning the combined list of identified database entries to the client computer system.

14. The computer system of claim 13, wherein the length of a search hash value is inversely proportional to the length of an interval.

15. The computer system of claim 13, wherein a first database entry matching a first hash value generated from the first search parameter and a second database entry matching a second hash value generated from the second search parameter are identified when searching the database.

16. The computer system of claim 13, wherein generating the search hash values comprises identifying, from a plurality of intervals, an interval that contains at least a portion of the first range of values, wherein the plurality of intervals are a previously identified interval divided into a number of equally sized intervals.

* * * * *